United States Patent [19]

Hagerty et al.

[11] Patent Number: 5,514,634
[45] Date of Patent: * May 7, 1996

[54] HIGH ACTIVITY POLYETHYLENE CATALYSTS

[75] Inventors: Robert O. Hagerty, Metuchen; Per K. Husby, Somerset; Yury V. Kissin, East Brunswick; Robert I. Mink, Warren; Thomas E. Nowlin, Cranbury, all of N.J.

[73] Assignee: Mobil Oil Corporation, Fairfax, Va.

[*] Notice: The portion of the term of this patent subsequent to Nov. 15, 2013, has been disclaimed.

[21] Appl. No.: 257,997

[22] Filed: Jun. 10, 1994

Related U.S. Application Data

[63] Continuation-in-part of Ser. No. 151,666, Nov. 15, 1993, Pat. No. 5,470,812, which is a continuation-in-part of Ser. No. 788,386, Nov. 6, 1991, Pat. No. 5,336,652.

[51] Int. Cl.$^6$ .......................... B01J 31/00; B01J 37/00
[52] U.S. Cl. ............................... 502/125; 502/120
[58] Field of Search ......................... 502/120, 125

[56] References Cited

U.S. PATENT DOCUMENTS

| | | | |
|---|---|---|---|
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348.6 |
| 4,148,754 | 4/1979 | Strobel et al. | 252/429 |
| 4,173,547 | 11/1979 | Graff | 252/429 |
| 4,302,566 | 11/1981 | Karol et al. | 526/125 |
| 4,335,016 | 6/1982 | Dombro | 252/429 B |
| 4,362,648 | 12/1982 | Dietz et al. | 252/429 B |
| 4,374,753 | 2/1983 | Pullukat et al. | 252/429 B |
| 4,378,304 | 3/1983 | Dombro | 252/429 B |
| 4,458,058 | 7/1984 | Dombro | 526/129 |
| 4,481,301 | 11/1984 | Nowlin et al. | 502/104 |
| 4,719,193 | 1/1988 | Levine et al. | 502/107 |
| 5,139,986 | 8/1992 | Cook et al. | 502/112 |

FOREIGN PATENT DOCUMENTS

| | | |
|---|---|---|
| 0261808 | 3/1988 | European Pat. Off. . |
| 0306939 | 3/1989 | European Pat. Off. . |

OTHER PUBLICATIONS

WO 93/09147; Nowlin, Thomas; High Activity Polyethylene Catalysts Prepared With Alkoxysilane Reagents, May/1993.

*Primary Examiner*—Ponnathapura Achutamurthy
*Attorney, Agent, or Firm*—Alexander J. McKillop; Malcolm D. Keen; Marina V. Schneller

[57] ABSTRACT

An ethylene polymerization catalyst is prepared by impregnating a porous support, such as silica, with an organomagnesium compound such as a dialkylmagnesium compound, contacting the magnesium-containing support with a silane compound which is free of hydroxyl groups, such as tetraalkoxysilanes, e.g. tetraethyl orthosilicate, and incorporating a transition metal component, such as titanium tetrachloride, in a specific ratio to the magnesium and silane components. Activation of this catalyst precursor with dimethylaluminum chloride as a cocatalyst results in a catalyst system which is effective for the production of ethylene copolymers with multimodal molecular weight distributions.

17 Claims, 4 Drawing Sheets

HIGH ACTIVITY POLYETHYLENE CATALYSTS

CROSS-REFERENCE TO RELATED APPLICATIONS

This application is a continuation-in-part of Ser. No. 08/151,666 filed Nov. 15, 1993 now U.S. Pat. No. 3,470,812, which in turn is a continuation-in-part of application Ser. No. 07/788,386 filed Nov. 6, 1991, now U.S. Pat. No. 5,336,652, each of which is relied upon and expressly incorporated by reference herein.

FIELD OF THE INVENTION

The invention relates to catalysts for the manufacture of linear polyethylene resins with densities between 0.918 and 0.945 g/cc and with a relatively narrow molecular weight distribution (MWD). Such resins can be processed on high-stalk extrusion equipment at high rates with excellent bubble stability and produce film with much improved toughness relative to the film made of polyethylene resins with a relatively broad MWD.

The present invention relates to a method for copolymerizing ethylene and alpha-olefins, a catalyst for such a copolymerization and a method for producing such a catalyst. A particular aspect of the present invention relates to a method for producing linear copolymers of ethylene and alpha-olefins of low density (LLDPE), and medium density, (MDPE).

The resins produced in accordance with the invention contain a polymer component with a relatively very high molecular weight, and their MWDs are multimodal. Blown film manufactured from these polymers exhibits excellent impact and tear properties. Furthermore, the resins can be processed into film by high stalk extrusion techniques.

BACKGROUND OF THE INVENTION

All commercial polyethylene resins used in high-stalk extrusion equipment have a relatively broad MWD as indicated by MFR values of 80–200. Although resins with relatively broad MWD exhibit good processability on high-stalk extrusion equipment, their film toughness properties, such as tear strength, are relatively poor.

In contrast, polyethylene resins with a relatively narrow MWD are not suited for high-stalk film extrusion equipment. We found, however, that even polyethylene resins with a relatively narrow MWD can be processed with such equipment if the resins contain a significant fraction of polymer molecules with very high molecular weights. Moreover, such resins exhibit excellent film properties such as impact strength and tear resistance.

One of the measures of MWD of a LLDPE or MDPE resin is its melt flow ratio (MFR), which is the ratio of the high-load melt index (HLMI or $I_{21}$) to the melt index (MI or $I_2$) for a given resin: MFR=$I_{21}/I_2$. The MFR value is an approximate indication of MWD of a polymer: the higher the MFR value, the broader the MWD. Common polyethylene resins for film applications usually have relatively low MFR values, e.g., of about 15 to about 30.

It is an object of the present invention to provide a high-activity catalyst for copolymerization of ethylene and alpha-olefins yielding products with a multimodal, relatively narrow MWD as indicated by MFR values in the 28–70 range. It is an additional object of the present invention to provide a catalytic process for copolymerizing ethylene with alpha-olefins which yields products with a bimodal MWD at high productivity.

SUMMARY OF THE INVENTION

A supported catalyst composition of this invention is intended for copolymerization of ethylene and alpha-olefins and is prepared in a multi-step process. In the first step, a slurry of a solid, porous carrier in a non-polar solvent is contacted with at least one organomagnesium compound of the formula $R_m MgR'_n$ where R and R' are the same or different alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg.

Subsequently, the mixture of the first step is contacted with at least one silane compound of formula $(R^1O)_x SiR^2_y$, wherein x is 1, 2, 3, or 4 and y is 4-x; $R^1$ is a hydrocarbyl group of 1 to 10 carbon atoms; and $R^2$ is a halogen atom, preferably chlorine, or a hydrocarbyl group of 1 to 10 carbon atoms, or a hydrogen atom. The mixture is then contacted with at least one transition metal compound soluble in the non-polar solvent, and dried.

The resulting solid catalyst precursor is subsequently contacted with the cocatalyst, dimethylaluminum chloride (DMAC) to produce the catalyst system.

DETAILED DESCRIPTION OF THE INVENTION

The catalyst systems described herein exhibit unique catalytic effects in olefin polymerization. When used in copolymerization of ethylene and alpha-olefins, the catalysts produce products with bimodal and trimodal MWDs, in a single reactor. The phrase "a resin with a bimodal molecular weight distribution" means herein that the resins produced by the catalyst systems of the invention contain a relatively lower molecular weight (LMW) component and the second component of a relatively higher molecular weight (HMW) than that of the first component. The phrase "a resin with a trimodal molecular weight distribution", as used herein, means that the resins produced by the catalyst systems of the invention contain three components which differ from each other in molecular weight: a first, relatively LMW component, a second component of an intermediate molecular weight, and the third component which has the highest molecular weight of the three components. The amount of the HMW component in the bimodal or trimodal products, can range from 5 to 50 weight percent.

The resins so produced exhibit the MFR values in the range of 25 to 80, preferably 30 to 75, and most preferably, 35 to 70.

The films, fabricated from the resins exhibit superior dart impact properties and machine-direction (MD) tear properties. Dart impact is measured by ASTM D-1709, Method A($F_{50}$) with a 38.1-mm dart, and a drop height of 0.66 meters. MD tear is measured by ASTM D-1922. For example, the 1.0 mil films produced with catalysts of this invention exhibit dart drop strength in the range from 100 g to greater than 800 g and usually higher than 400 grams; in particular, dart drops are in the range of 400 to 1500, and preferably 800 to 1500.

Such resins can be used in high stalk film extrusion processes. This is entirely unexpected for LLDPE products produced With titanium-based catalysts and with densities less than 0.94, because LLDPE resins produced with conventional titanium-based catalysts cannot be processed on high-stalk extrusion equipment.

The unique catalyst compositions of the invention comprise a solid supported catalyst precursor and DMAC (dimethylaluminum chloride) as an activator (cocatalyst).

Catalysts produced according to aspects of the present invention may be described in terms of the manner in which they can be made. Suitable carrier materials include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray-dried silica.

The carrier material must be porous. The internal porosity of these carriers may be larger than 0.2 cm$^3$/g. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting it with water-reactive magnesium compounds. This water removal may be accomplished by heating the carrier material. A suitable range of temperatures is from about 100° C. to about 800° C., preferably from about 150° C. to about 650° C.

Hydroxyl groups such as silanol (Si—OH) groups may be present in the carrier, when it is contacted with the magnesium compounds. These OH groups may be present at about 0.3 mmoles or more per gram of carrier. Although, in general, from about 0.5 to about 5 mmol of OH groups per gram of carrier may be present a preferred range is from about 0.3 to about 0.9 mmol of OH groups per gram of carrier. Excess OH groups present in the carrier may be removed by heating the carrier for a sufficient time at a sufficient temperature. For example, a relatively small number of OH groups may be removed by heating at from about 150° C. to about 250° C., whereas a relatively large number of OH groups may be removed by heating at at least 500° to 800° C., most preferably, from about 550° C. to about 650° C. The duration of heating may be from 4 to 16 hours. In a most preferred embodiment, the carrier is silica which, prior to the use thereof in the first catalyst synthesis step, has been dehydrated by fluidizing it with nitrogen or air and heating at least about 600° C. for about 4–16 hours to achieve a surface hydroxyl group concentration of about 0.7 millimoles per gram (mmol/g). The surface hydroxyl concentration in silica may be determined according to J. B. Peri and A. L. Hensley, Jr., *J. Phys. Chem.*, 72 (8), 2926 (1968). Internal porosity of carriers can be determined by a technique termed BET-technique, described by S. Brunauer, P. Emmett and E. Teller in *Journal of the American Chemical Society*, 60, pp. 209–319 (1938). Specific surface areas of carriers can also be measured in accordance with the above-mentioned BET-technique, with use of the standardized method as described in *British Standards* BS 4359, Volume 1, (1969).

The silica of the most preferred embodiment is a high surface area, amorphous silica (surface area=300 m$^2$/g; pore volume of 1.65 cm$^3$/g), and it is a material marketed under the tradenames of Davison 952 or Davison 955 by the Davison Chemical Division of W. R. Grace and Company. When such silica has been dehydrated by fluidizing with nitrogen or air and heating at about 600° C. for about 4–16 hours, the surface hydroxyl concentration is about 0.72 mmol/g.

While heating is a preferred means of removing OH groups inherently present in a carrier such as silica, other removal means are also possible such as chemical means. For example, a desired fraction of OH groups may be reacted with a chemical agent such as a hydroxyl-reactive organs aluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent.

To prepare a supported catalyst, the carrier material is slurried in a non-polar solvent at about 25° to about 100° C., preferably to about 40° to about 60° C.

Suitable non-polar solvents are materials in which all of the reactants used herein, e.g., the organomagnesium compound, silane compounds, and the transition metal compounds, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

The resulting slurry is first contacted with at least one organomagnesium compound.

The organomagnesium compound has the empirical formula $R_mMgR'_n$ where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg.

In the most preferred embodiment of the synthesis of this catalyst it is important to add only such an amount of the organomagnesium compound that will be deposited— physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the reagents added subsequently, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the excess of the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 1:1 to about 4:1, preferably about 1.1:1 to about 2.8:1, more preferably about 1.2:1 to about 1.8:1 and most preferably about 1.4:1. The reaction between the carrier and the organomagnesium compound is carried out at 35°–75° C. for 10 minutes to 10 hours.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

It is noted that if the organomagnesium compound is only sparingly soluble, e.g., to the extent of even 1 percent or less, the organomagnesium compound which is consumed by reactive sites on the carrier will be replaced by further dissolution of undissolved organomagnesium compound by a mass-action effect.

The second step in the production of the catalyst composition of the invention is the addition to the aforementioned slurry of a silane compound which is free of hydroxy groups, $(R^1O)_x SiR^2_y$ wherein x is 1, 2, 3, or 4 and y is 4-x; $R^1$ is a hydrocarbyl group of 1 to 10 carbon atoms; and $R^2$ is a halogen atom, preferably chlorine, or a hydrocarbyl group of 1 to 10 carbon atoms, or a hydrogen atom. The preferred species of silane compound are those defined by $Si(OR)_4$ wherein R is a $C_1$–$C_{10}$ hydrocarbyl group, preferably a hydrocarbyl group of 2 to 6 carbon atoms. Hydrocarbyl groups include alkyl, aryl, arylalkyl, alkenyl and arylalkenyl, containing 1 to 10 carbon atoms. Specific silane compounds which can be used in accordance with the invention include tetramethoxysilane, tetraethoxysilane, tetraisopropoxysilane, tetrapropoxysilane, tetrabutoxysilane, tetraphenoxysilane, tetrakis(2-methoxyethoxy) silane, tetrakis(2-ethylhexoxy)silane, and tetraallyloxysilane.

Before the introduction of the silane compound, the slurry of the carrier material and of the organomagnesium compound in the solvent is maintained at temperatures of about 40° to about 65° C. The amount of the silane compound added to the slurry is such that the molar ratio of the silane compound to Mg on the solid carrier is about 0.40 to about 1.00, preferably about 0.50 to about 0.80, more preferably about 0.55 to about 0.75 and most preferably about 0.66. The reaction is carried out for 10 minutes to 10 hours.

Finally, the slurry is contacted with at least one transition metal compound soluble in the non-polar solvent. Suitable transition metal compounds used herein are compounds of metals of Groups 4–10 adopted by IUPAC of the Periodic Chart of the Elements, as published by the Fisher Scientific Company, providing that such compounds are soluble in the non-polar solvents. The preferred transition metal compounds are titanium compounds, preferably tetravalent titanium compounds. The most preferred titanium compound is titanium tetrachloride. Mixtures of transition metal compounds may also be used and generally no restrictions are imposed on the transition metal compounds which may be included. Any transition metal compound that may be used alone may also be used in conjunction with other transition metal compounds.

This synthesis step is conducted at about 25° to about 75° C., preferably at about 30° to about 65° C., and most preferably at about 45° to about 60° C. for 10 min. to 10 hours. In a preferred embodiment, the amount of the transition metal compound added is not greater than that which can be deposited onto the carrier. The exact molar ratio of the transition metal to Mg and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of transition metal to Mg is about 0.33 to about 1.5, preferably about 0.5 to about 1.

In accordance with preferred embodiments of the invention, the proportions of the components of the catalyst precursor of the invention satisfy the following rule: the ratio $$K = \frac{[Ti]}{[Mg] + 4[Si]}$$

must be less than 0.4 and, preferably, be in the 0.23 to 0.31 range. Outside of this range of K values (from 0.23 to 0.31), the toughness of the LLDPE resins, catalyzed by the catalysts of the invention and the strength of the films fabricated therefrom decline. The "[Ti]", "[Mg]" and "[Si]" in the formula refer to the concentrations of titanium (provided by the transition metal compound, e.g. $TiCl_4$); magnesium (provided by the organomagnesium compound) and silicon (provided by the silane compound). The concentration of each is presented in units of mmol/gram silica.

The slurry of the supported catalyst precursor formed from the four components described above is dried of the solvent at 25° to 75° C. for 1–10 hours. Then it is activated with dimethylaluminum chloride as a cocatalyst.

The catalyst precursor may be activated in situ by adding the cocatalyst and the solid catalyst precursor separately to the polymerization medium. It is also possible to combine the catalyst precursor and the cocatalyst before introduction into the polymerization medium, e.g., for up to about 2 hours at a temperature from about −40 to about 80° C.

A suitable activating amount of the cocatalyst may be used. The number of moles of the cocatalyst per gram atom of titanium in the catalyst may be from about 1 to about 500 and is preferably greater than 5.

Ethylene and alpha-olefins may be copolymerized with the catalyst systems prepared according to aspects of the present invention by any suitable process. Such processes include polymerizations carried out in suspension, in solution or in the gas phase. Gas phase polymerizations are preferred such as those taking place in stirred bed reactors and, especially, fluidized bed reactors. The ethylene copolymers prepared in accordance with the present invention may be copolymers of ethylene with one or more $C_3$–$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. The most preferred polymers are copolymers of ethylene with 1-hexene, 1-butene or 4-methyl-1-pentene.

The ethylene copolymers produced in accordance with the present invention preferably contain at least about 80 percent by weight of ethylene units, and most preferably contain from 90 to 95 weight percent of ethylene units.

The molecular weight of the copolymers may be controlled in a known manner, preferably by using hydrogen. With the catalysts produced according to aspects of the present invention, molecular weight may be suitably controlled with hydrogen when the polymerization is carried out at relatively low temperatures, e.g., from about 30° to about 105° C. This control of molecular weight may be evidenced by a measurable positive change of the melt index ($I_2$).

The catalyst systems prepared according to aspects of the present invention are particularly useful for the production of linear low density and medium density ethylene polymers. Such polymers may have a density of 0.945 g/cc.

The molecular weight distributions of the ethylene copolymers prepared in the presence of the catalysts of the present invention, may be characterized by the values of their melt flow ratios, MFR. MFR is defined herein as the ratio of the high load melt index (HLMI or $I_{21}$) divided by the melt index ($I_2$), i.e., MFR=$I_{21}/I_2$. Low MFR values indicate polymers with relatively narrow MWDs.

The MWD of the polymers prepared in the presence of the catalysts of the present invention, as expressed by the MFR values, varies from about 28 to about 80 for LLDPE and MDPE products having a density of about 0.920 to about 0.945 g/cc. As is known to those skilled in the art, such MFR values are indicative of a relatively narrow MWD The physical and mechanical properties of the films made from the resins polymerized with the catalyst systems of this invention are better than those of the resins polymerized with trialkylaluminum compounds such as triethylaluminum, as cocatalysts.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as g/cc. |
| Melt Index (MI), $I_2$ | ASTM D-1238 - Condition E - Measured at 190° C. - reported as grams per 10 minutes. |
| High Load Melt (HLMI), Index $I_{21}$ | ASTM D-1238 - Condition F - Measured at 10.5 times the weight used in the melt index test above. |
| Melt Flow Ratio | (MFR) = $I_{21}/I_2$ |
| Comonomer Content | Comonomer contents of ethylene copolymers were measured by the infrared spectroscopic method, as described in the article of T. E. Nowlin, Y. V. Kissin and K. P. Wagner HIGH ACTIVITY ZIEGLER-NATTA CATALYST FOR THE PREPARATION OF ETHYLENE COPOLYMERS, Journal of Polymer Science: Part A: Polymer Chemistry, Volume 26, pages 755–764 (1988). |
| Dart Impact | ASTM D1709 Free Falling DART Method (F50) |
| Tear Strength | ASTM D-1922 |

EXAMPLES

Example 1

Catalyst Precursor (A): 3.04 gram of silica calcined at 600° C. for 4 hours was weighed into a 100 ml pear-flask, containing a magnetic stirring bar, followed by ca. 40 ml of dry heptane. The flask was placed into a 62° C. oil bath. Next, dibutylmagnesium (3.09 mmol) was added to the silica/heptane slurry. The contents of the flask were stirred for 45 minutes. Then, 1-butanol (6.04 mmol) in heptane was added to the flask and the contents were stirred for 55 minutes. Finally, titanium tetrachloride (3.03 mmol) was added to the flask and stirring was continued for 45 minutes. The solvent was removed from the flask with a nitrogen purge and 3.8 gram of a white free-flowing powder of the catalyst precursor was obtained.

Example 2

Catalyst Precursor (B): 3.04 gram of silica calcined at 600° C. for 4 hours was weighed into a 100 ml pear-flask, containing a magnetic stirring bar, followed by ca. 40 ml of dry heptane. The flask was placed into a 63° C. oil bath. Next, dibutylmagnesium (1.92 mmol) was added to the silica/heptane slurry. The contents of the flask were stirred for 90 minutes. Next, titanium tetrachloride (3.03 mmol) was added to the flask and stirring was continued for 45 minutes. The solvent was removed from the flask with a nitrogen purge and 3.5 gram of a dark brown, free-flowing powder of catalyst precursor B was obtained.

Example 3

Catalyst Precursor (C): 5.06 gram of silica calcined at 600° C. for 4 hours was weighed into a 300 ml pear-flask, containing a magnetic stirring bar, followed by ca. 75 ml of dry heptane. The flask was placed into a 55° C. oil bath. Next, dibutylmagnesium (5.06 mmol) was added to the silica/heptane slurry. The contents of the flask were stirred for 80 minutes. Then, carbon tetrachloride (6.68 mmol) was added to the flask and the contents were stirred for 45 minutes. Finally, titanium tetrachloride (5.07 mmol) was added to the flask and stirring was continued for 45 minutes.

The solvent was removed from the flask with a nitrogen purge and 5.59 gram of a light brown free-flowing powder of catalyst precursor C was obtained.

Example 4

Catalyst Precursor (D): 207.1 gram of silica calcined at 600° C. for 4 hours was weighed into a four-neck, 3-liter round-bottom flask fitted with an overhead stirrer. The flask was placed into an oil bath at ca. 60° C. and 1300 ml of dry heptane was added to the flask. Next, dibutylmagnesium (207.6 mmol) was added to the silica/heptane slurry over a period of 5 minutes. Then, 1,1,1 trichloroethane (251 mmol) was added to the flask in about 40 seconds and the contents were stirred for 60 minutes. Next, titanium tetrachloride (187 mmol) was added to the flask and stirring was continued for 60 minutes. The solvent was removed from the flask with a nitrogen purge and 230 gram of a light brown free-flowing powder of catalyst precursor D was obtained.

Example 5

Catalyst Precursor (E): 6.00 gram of silica calcined at 600° C. for 6 hours was weighed into a 300 ml pear-flask, containing a magnetic stirring bar, followed by ca. 100 ml of dry heptane. The flask was placed into a 55° C. oil bath. Next, dibutylmagnesium (6.00 mmol) was added to the silica/heptane slurry. The contents of the flask were stirred for 62 minutes. Then, tetraethyl orthosilicate (3.96 mmol) was added to the flask and the contents were stirred for 128 minutes. Finally, titanium tetrachloride (6.00 mmol) was added to the flask and stirring was continued for 57 minutes. The solvent was removed from the flask with a nitrogen purge and 3.4 gram of a free-flowing powder of catalyst precursor E was obtained.

Example 6

Catalyst Precursor (F) A catalyst precursor was synthesized according to the teachings of Yamaguchi et al, U.S. Pat. No. 3,989,881, and Karol et al, European Patent Application 84103441.6.

(a) Preparation of Precursor

In a 12 liter flask equipped with a mechanical stirrer were placed 41.8 gram (0.439 mol) of anhydrous $MgCl_2$ and 2.5 liters of tetrahydrofuran. To this mixture, 29.0 gram (0.146 mol) of $TiCl_3.0.33 AlCl_3$ powder were added over a ½ hour period. The mixture was then heated at 60° C. for another ½ hour in order to completely dissolve all materials.

Separately, five hundred gram of silica were dehydrated by heating at a temperature of 600° C. and slurried in 3 liters of isopentane. The slurry was pretreated with 186 ml of a 20 percent by weight solution of TEAL in hexane which was added to the stirred silica slurry over a ¼ hour period. The resulting mixture was then dried under a nitrogen purge at 60° C. over a period of about 4 hours to provide a dry, free-flowing powder containing 5.5 wt.% of the aluminum alkyl.

Finally, the pretreated silica was added to the solution of the catalyst components prepared as above. The resulting slurry was stirred for ¼ hour and then the solvent was dried under a nitrogen purge at 60° C. over a period of about 4 hours to provide free-flowing powder of the catalyst precursor F.

Six different catalyst precursors of Examples 1–6 were evaluated with DMAC as cocatalyst in order to determine the effect of the catalyst precursor type on the fraction of the HMW component in the polymer. Typical slurry polymerization conditions in these experiments, as described here for catalyst precursor D were as follows: A 1.6-liter stainless steel autoclave, at 53° C., was filled with 0,750 liter of dry heptane, 0,120 liter of dry 1-hexene and 3.0 mmol of DMAC while under a slow nitrogen purge. The stirring rate was set at about 900 rpm, the internal temperature was increased to ca. 85° C, and the internal pressure was raised from 8.0 psi to 59 psi with hydrogen. Ethylene was introduced to maintain the total pressure at about 200 psig. Next, 0.0192 gram of catalyst precursor D was introduced into the reactor with ethylene over-pressure and the temperature was maintained at 85° C. continued for 60 minutes. Then the ethylene supply was stopped and the reactor was allowed to cool to room temperature. A yield of 59.4 gram of polyethylene was obtained. High-load flow index (HLMI) of this polymer was 8.67 and the Melt Flow Ratio was 38.0. The polymer contained 1.40 mol.% of 1-hexene. The laboratory slurry polymerization data is summarized in Table I. The GPC chromatograms of the polymers prepared with each type of catalyst system are illustrated in FIGS. 1–6.

TABLE I

Figure 1:
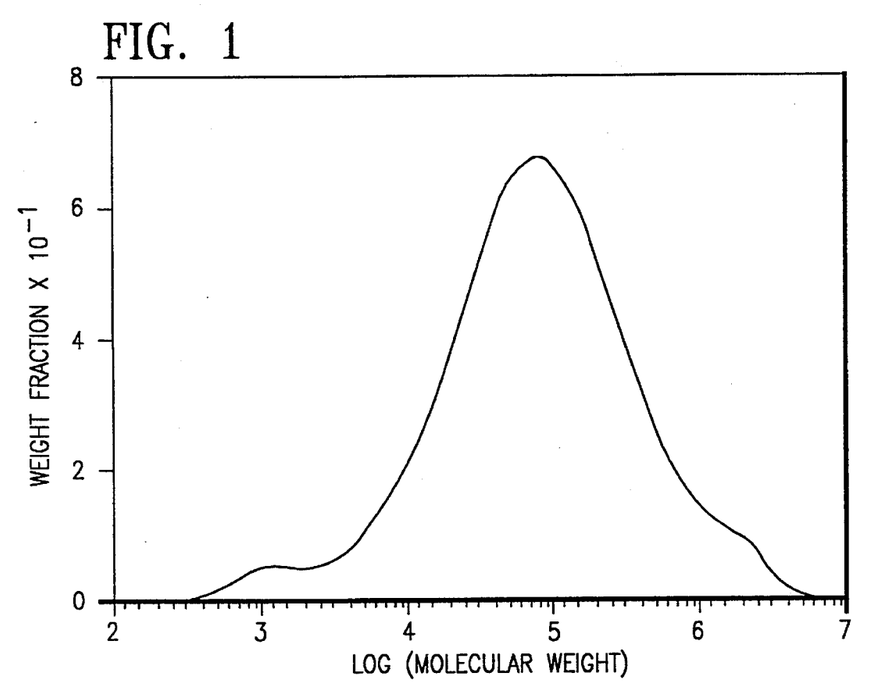
FIG. 1 is a GPC chromatogram of a resin produced with a catalyst system comprising product precursor of Example 1.
Figure 2:
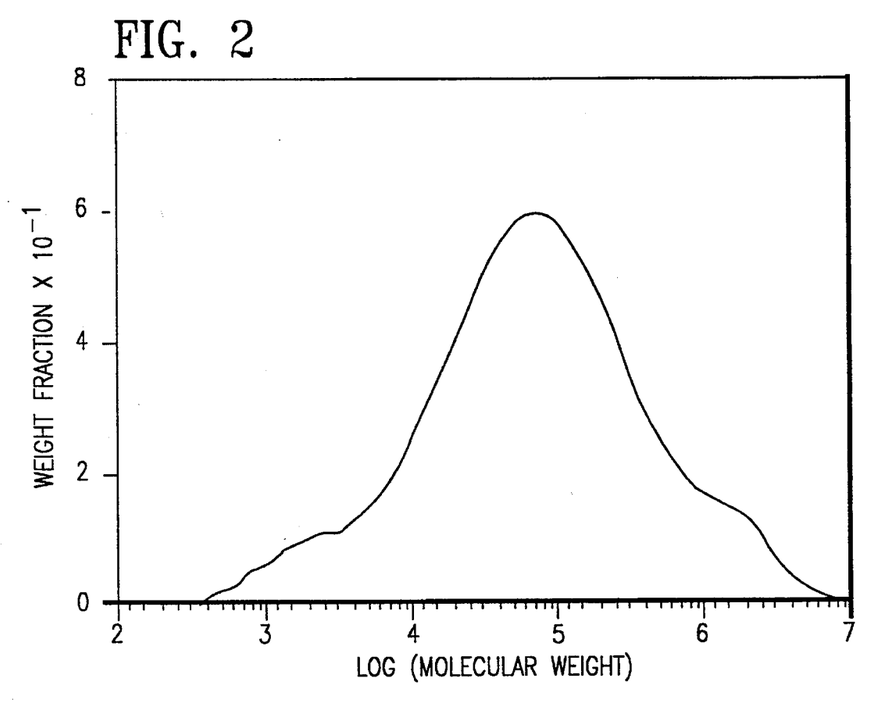
FIG. 2 is a GPC chromatogram of a resin produced with a catalyst system comprising product precursor of Example 2.
Figure 3:
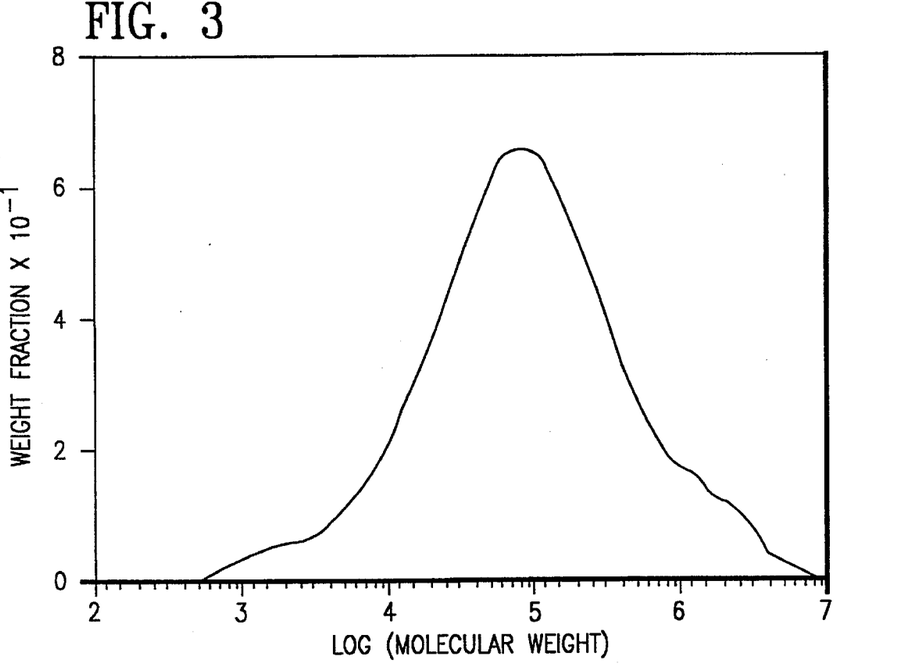
FIG. 3 is a GPC chromatogram of a resin produced with a catalyst system comprising product precursor of Example 3.
Figure 4:
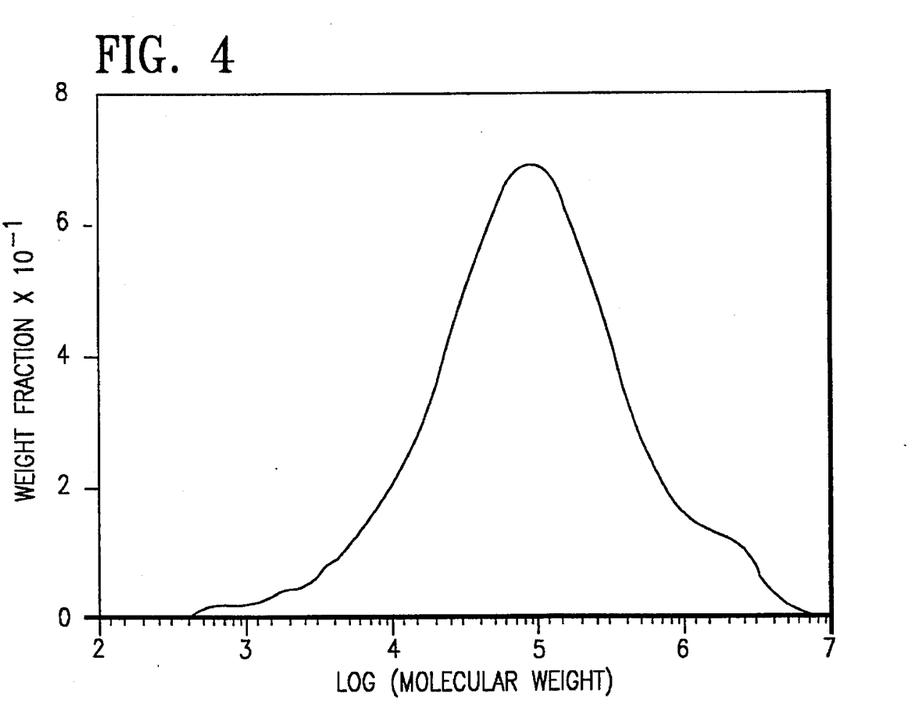
FIG. 4 is a GPC chromatogram of a resin produced with a catalyst system comprising product precursor of Example 4.
Figure 5:
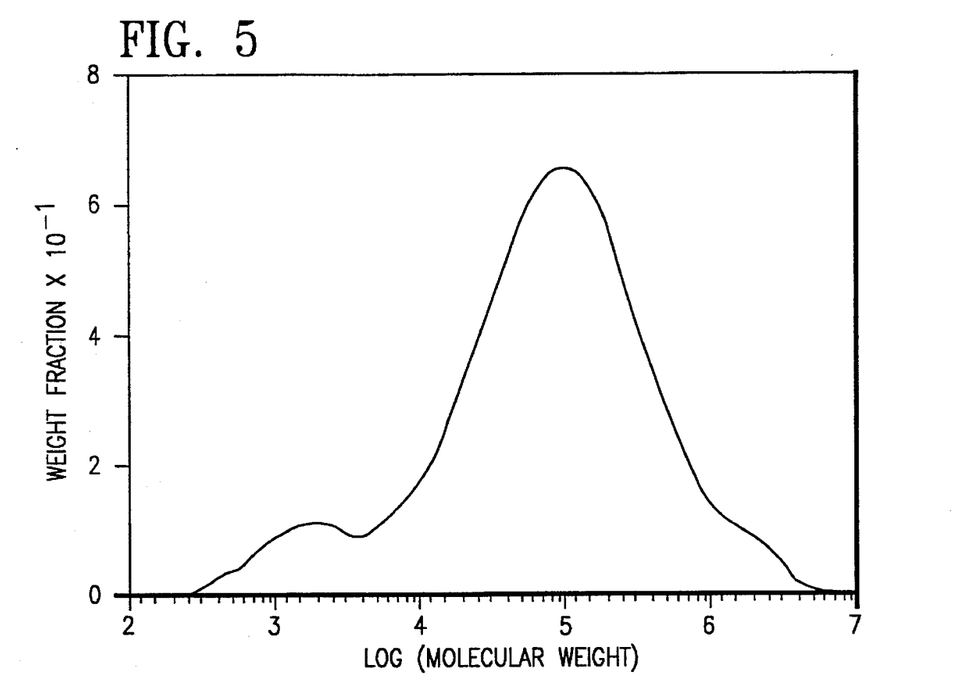
FIG. 5 is a GPC chromatogram of a resin produced with a catalyst system comprising product precursor of Example 5.
Figure 6:
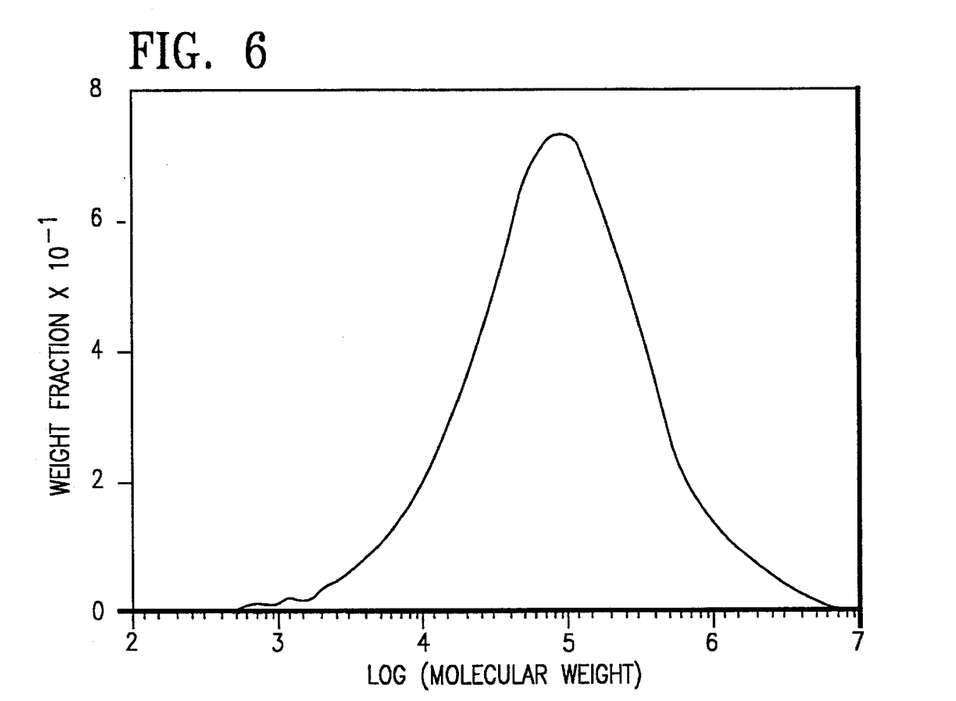
FIG. 6 is a GPC chromatogram of a resin produced with the catalyst system product of Example 6.

| Catalyst Precursor | Laboratory Slurry Polymerization Data | | | | | |
| --- | --- | --- | --- | --- | --- | --- |
| | Activity g/g/h | FI 21 | MFR $I_{21}/I_2$ | 1-Hexene mol % | HMW Component (wt %) | GPC Figure Number |
| A | 2130 | 7.0 | 33.1 | 1.25 | 10.8 | FIG. 1 |
| B | 1250 | 10.6 | 52.2 | 1.35 | 13.4 | FIG. 2 |
| C | 2609 | 8.6 | 38.8 | 1.45 | 12.8 | FIG. 3 |
| D | 3080 | 8.7 | 38.0 | 1.40 | 10.8 | FIG. 4 |
| E | 1570 | 8.1 | 33.5 | 1.70 | 9.2 | FIG. 5 |
| F | 2390 | 12.8 | 28.9 | 1.15 | 7.2 | FIG. 6 |

Figure 7:
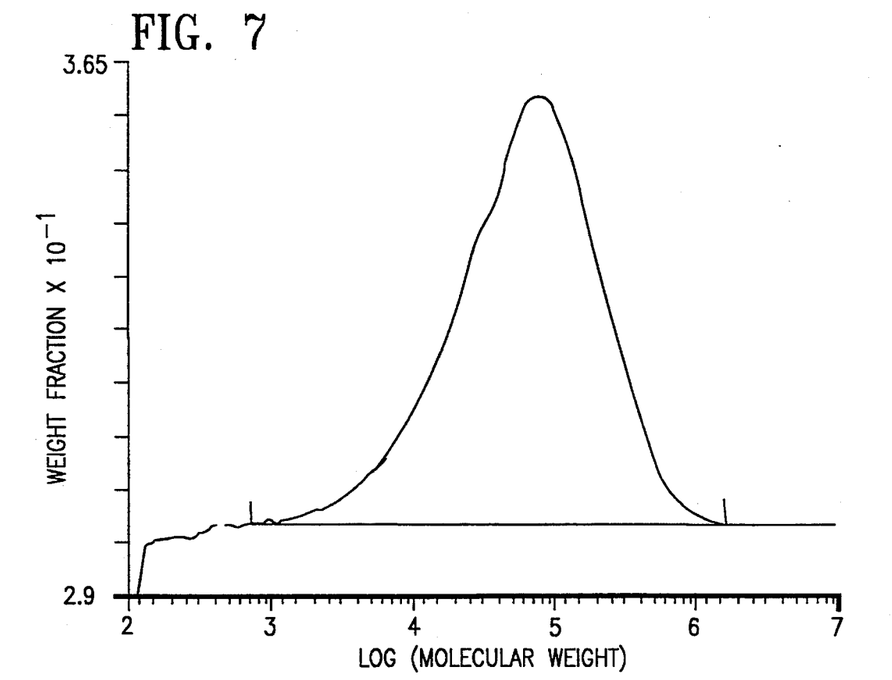
FIG. 7 is a GPC chromatogram of a LLDPE resin produced with a catalyst system in which trimethylaluminum (TMA) was used as a substitute for DMAC.
Figure 8:
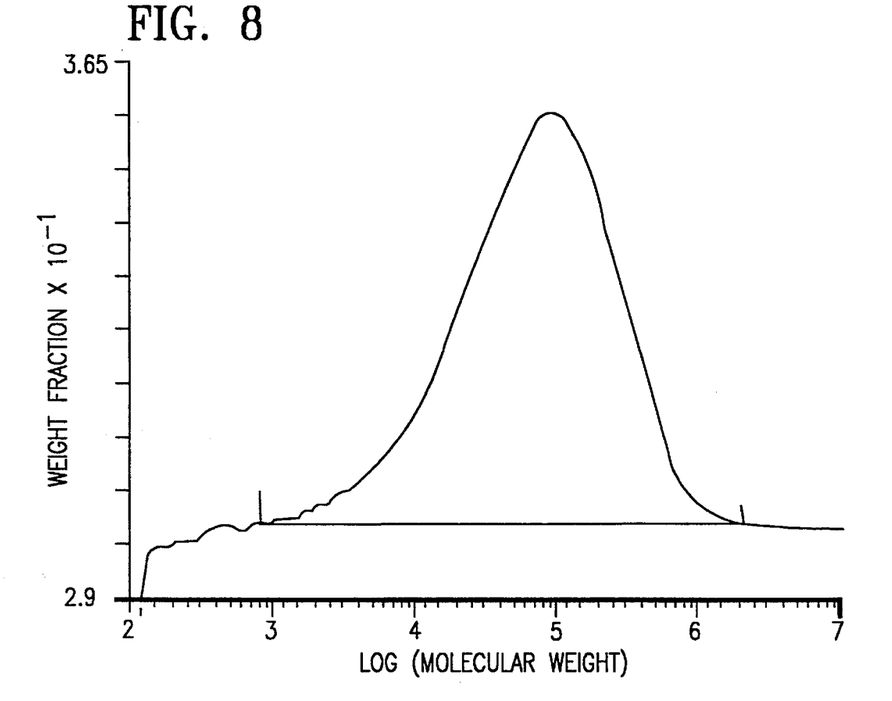
FIG. 8 is a GPC chromatogram of a LLDPE resin produced with a catalyst system in which triethylaluminum (TEAL) was used as a substitute for DMAC.

Each of the five catalyst systems A–E yielded resins with a larger HMW-component than that of the resin prepared with catalyst system F, both in slurry and gas phase reactors. Catalyst system F provided a resin with 7.2 wt% of HMW component under slurry polymerization conditions while the five Other catalyst systems produced 9.2–13.4 wt% of the HMW component in slurry. In contrast, when the catalyst precursors are activated with a trialkylaluminum compound, the resins do not contain a HMW component. For example, FIGS. 7 and 8 show the GPC chromatograms of resins prepared with Catalyst Precursor F activated with triethylaluminum and trimethylaluminum, respectively.

Table II summarizes some gas-phase fluidized bed product data for Catalyst systems F, E, and C.

TABLE II

| Pilot Plant Polymerization Data | | |
| --- | --- | --- |
| Catalyst Precursor | HME Component (wt %) | Bubble Stability of a film |
| C | 16.6 | Excellent |
| E | 12.7 | Good |
| F | 8.3 | Poor |

Catalyst system C gave a polymer with the largest amount (16.6 wt%) of the HMW component while catalyst systems E and F produced resins with 12.7 wt% and 8.3 wt% of the HMW component, respectively.

Catalyst systems A, B, C, and E gave a substantial amount of a LMW component in slurry polymerizations, whereas catalyst systems D and F did not produce much of a LMW component. FIGS. 1–6 illustrate the GPC chromatograms for resins prepared with these catalysts in a slurry reactor.

Catalyst systems C, E and F have been evaluated in the fluidized-bed reactor and the GPC chromatograms of these resins produced with these catalysts did not contain a distinct LMW component. It is inferred that there is a process effect on the polymer molecular weight composition under the polymerization conditions used. In slurry, resins produced with some of these catalyst systems possess a trimodal MWD; however, the same catalyst systems produced resins in the gas-phase reactors in which the LMW component was substantially absent.

The relative bubble stability of the film manufactured from the resins produced with DMAC as a cocatalyst in combination with precursors of Examples 3, 5 and 6 are described in the Table II.

Thus it is apparent that there has been provided, in accordance with the invention, a catalyst system composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for copolymerizing ethylene and an alpha-olefin of 3 to 10 carbon atoms, comprising a solid supported catalyst precursor and dimethylaluminum chloride as a cocatalyst wherein the precursor comprises
   (i) silica, wherein the silica has 0.4 to 0.9 mmol of OH groups per gram of silica;
   (ii) a dialkylmagnesium compound, $R_m MgR'_n$, wherein each of R and R' is an alkyl group of 4 to 10 carbon atoms, and wherein m plus n equal the valence of magnesium, wherein the dialkylmagnesium compound is present in an amount to provide a Mg:OH molar ratio of 1.0 to 1.8;
   (iii) tetraalkyl orthosilicate, in an amount to provide a tetraalkyl orthosilicate:Mg molar ratio of 0.50 to 0.80, wherein the alkyl group contains 2 to 6 carbon atoms;
   (iv) titanium tetrachloride in an amount to provide a Ti:Mg molar ratio of 0.7 to 1.4.

2. The catalyst of claim 1, wherein the solid catalyst precursor is characterized by the K value, which is defined as $$K = \frac{[Ti]}{[Mg] + 4[Si]},$$

wherein [Ti] is the molar titanium content provided by $TiCl_4$, [Mg] is the molar magnesium content provided by said dialkylmagnesium compound; [Si] is the molar silicon content provided by said tetraalkyl orthosilicate, and K is 0.23 to 0.31.

3. The catalyst of claim 2, wherein the tetraalkyl orthosilicate is tetraethyl orthosilicate or tetrabutyl orthosilicate.

4. The catalyst of claim 1, wherein the tetraalkyl orthosilicate is tetraethyl orthosilicate.

5. The catalyst of claim 1, wherein the precursor is formed by the steps comprising
   (i) providing a slurry of silica in a non-polar solvent, wherein the silica has 0.4 to 0.9 mmol of OH groups per gram of silica;
   (ii) contacting said silica with said dialkylmagnesium compound in an amount to provide a Mg:OH molar ratio of 1.0 to 1.8.
   (iii) adding to said step (ii) product tetraalkyl orthosilicate in which the alkyl group contains 2 to 6 carbon atoms, in an amount to provide a tetraalkyl orthosilicate:Mg molar ratio of 0.50 to 0.80;
   (iv) contacting said step (iii) product with titanium tetrachloride in an amount to provide a Ti:Mg molar ratio of 0.7 to 1.4.

6. A catalyst composition for copolymerizing ethylene and an alpha-olefin of 3 to 10 carbon atoms, comprising a solid supported catalyst precursor and dimethylaluminum chloride as a cocatalyst to activate said catalyst precursor, wherein the precursor comprises
   (i) silica, wherein the silica has 0.4 to 0.9 mmol of OH groups per gram of silica;
   (ii) a dialkylmagnesium compound, $R_m MgR'_n$ wherein each of R and R' is an alkyl group of 4 to 10 carbon atoms, and wherein m plus n equal the valence of magnesium, wherein the dialkylmagnesium compound is present in an amount to provide a Mg:OH molar ratio of 1.0 to 1.8,
   (iii) tetraethyl orthosilicate, in an amount to provide a tetraethyl orthosilicate:Mg molar ratio of 0.50 to 0.80;
   (iv) titanium tetrachloride in an amount to provide a Ti:Mg molar ratio of 0.7 to 1.4.

7. The catalyst composition of claim 6, wherein the solid catalyst precursor is characterized by the K value which is defined as $$K = \frac{[Ti]}{[Mg] + 4[Si]},$$

wherein [Ti] is the molar titanium content provided by $TiCl_4$, [Mg] is the molar magnesium content provided by said organomagnesium compound; [Si] is the molar silicon content provided by said tetraethyl orthosilicate, and K is less than 0.4.

8. The catalyst of claim 6, wherein the K is in the range of 0.23 to 0.31.

9. The catalyst of claim 6, wherein the precursor is formed by the steps comprising
   (i) providing a slurry of silica in a non-polar solvent, wherein the silica has 0.4 to 0.9 mmol of OH groups per gram of silica;
   (ii) contacting said silica with said dialkylmagnesium compound in an amount to provide a Mg:OH molar ratio of 1.0 to 1.8;

(iii) adding to said step (ii) product tetraethyl orthosilicate in an amount to provide a tetraethyl orthosilicate:Mg molar ratio of 0.50 to 0.80;

(iv) contacting said step (iii) product with titanium tetrachloride in an amount to provide a Ti:Mg molar ratio to form said catalyst precursor of 0.7 to 1.4.

10. The catalyst of claim 9, wherein steps (i)–(iv) are undertaken at a temperature in the range of 40 to 65 degrees C.

11. The catalyst of claim 6, wherein synthesis of the solid catalyst precursor is undertaken at a temperature in the range of 40 to 65 degrees C.

12. A catalyst composition for copolymerizing ethylene and an alpha-olefin of 3 to 10 carbon atoms, comprising a solid supported catalyst precursor and dimethylaluminum chloride as a cocatalyst to activate said catalyst precursor, wherein the improvement comprises a precursor comprising (i) silica, wherein the silica has 0.4 to 0.9 mmol of OH groups per gram of silica;

(ii) dibutylmagnesium, in an amount to provide a Mg:OH molar ratio of 1.0 to 1.8

(iii) tetraethyl orthosilicate, in an amount to provide a tetraethyl orthosilicate:Mg molar ratio of 0.50 to 0.80;

(iv) titanium tetrachloride, in an amount to provide a Ti:Mg molar ratio of 0.7 to 1.4 wherein the catalyst precursor is characterized by the K value which is defined as $$K = \frac{[Ti]}{[Mg] + 4[Si]],$$

wherein [Ti] is the molar titanium content provided by $TiCl_4$, [Mg] is the molar magnesium provided by said dibutylmagnesium; [Si] is the molar silicon content provided by said tetraethyl orthosilicate, and K is 0.23 to 0.31.

13. The catalyst of claim 12, wherein the precursor is formed by the steps comprising (i) providing a slurry of silica in a non-polar solvent, wherein the silica has 0.4 to 0.9 mmol of OH groups per gram of silica;

(ii) contacting said silica with said dibutylmagnesium in an amount to provide a Mg:OH molar ratio of 1.0 to 1.8, to impregnate said silica;

(iii) adding to said step (ii) product tetraethyl orthosilicate, in an amount to provide a tetraethyl orthosilicate:Mg molar ratio of 0.50 to 0.80;

(iv) contacting said step (iii) product with titanium tetrachloride, in an amount to provide a Ti:Mg molar ratio of 0.7 to 1.4, to form said catalyst precursor.

14. The catalyst of claim 13, wherein steps (i)–(iv) are undertaken at a temperature in the range of 40 to 65 degrees C.

15. The catalyst of claim 13 wherein synthesis of the precursor is undertaken at a temperature in the range of 40 to 65 degrees C.

16. The catalyst of claim 10, wherein the precursor is formed by the steps comprising (i) providing a slurry of silica in a non-polar solvent, wherein the silica has 0.4 to 0.9 mmol of OH groups per gram of silica;

(ii) contacting said silica with said dibutylmagnesium in an amount to provide a Mg:OH molar ratio of 1.0 to 1.8;

(iii) adding, to said step (ii) product, tetraethyl orthosilicate, in an amount to provide a tetraethyl orthosilicate:Mg molar ratio of 0.50 to 0.80;

(iv) contacting said step (iii) product with titanium tetrachloride in an amount to provide a molar ratio of Ti:Mg of 0.7 to 1.4 to form said catalyst precursor.

17. The catalyst of claim 16, wherein steps (i)–(iv) are undertaken at a temperature in the range of 40 to 65 degrees C.

* * * * *